June 13, 1944.                H. M. STROBEL                2,351,079
                          INERTIA CONTROL SYSTEM
                          Filed Oct. 25, 1940          5 Sheets-Sheet 3
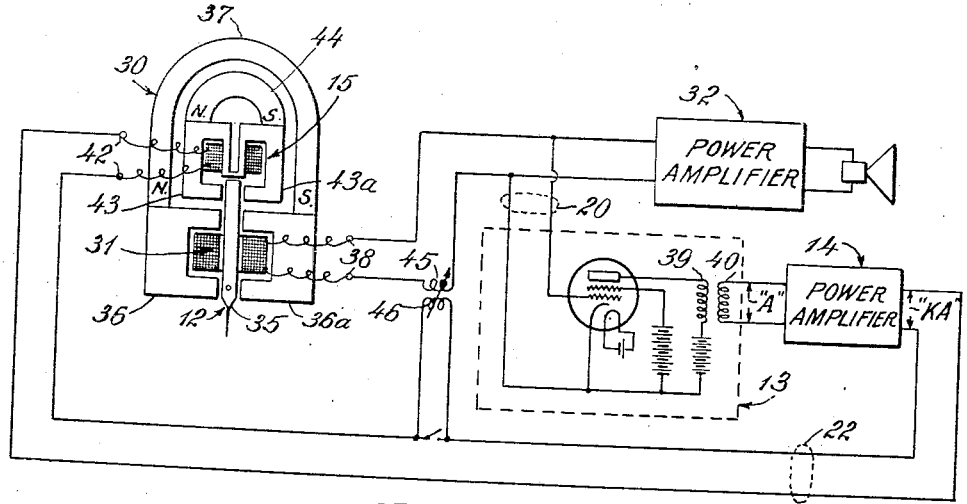
Fig. 3,
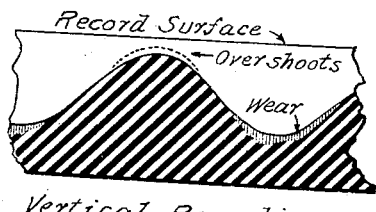
Vertical Recording.
Fig. 5,
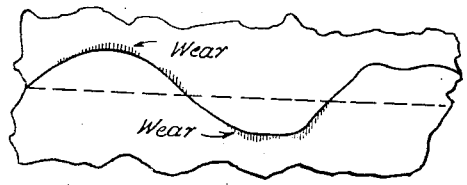
Lateral Recording.
Fig. 4,
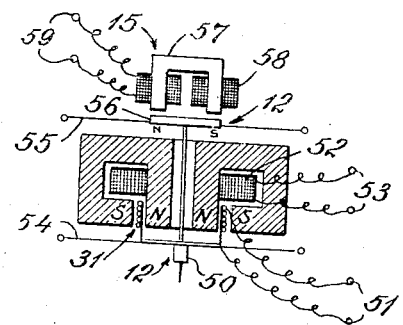
Fig. 6,
INVENTOR.
Howard M. Strobel.

INVENTOR.
Howard M. Strobel

INVENTOR.
Howard M. Strobel

Patented June 13, 1944

2,351,079

UNITED STATES PATENT OFFICE 2,351,079

INERTIA CONTROL SYSTEM

Howard M. Strobel, Allegany, N. Y.

Application October 25, 1940, Serial No. 362,885

21 Claims. (Cl. 179—100.4)

This invention relates to the control of inertial effects in mechanical systems, and particularly to moving mechanical systems in which a predetermined mode of motion is desired from the application of a limited actuating force, or in which it is desired that the mode of motion of a mechanical system accurately respond to a given actuating force function.

The object of the invention is to reduce the effective inertia, and the effects due to inertial forces, of a given mechanical mass when it is subjected to a given mode of displacement.

Attention is directed to the co-pending applications Serial Numbers 524,491 and 524,492 filed Feb. 29, 1944, which are divisions of this application, for further descriptions of the applications of the inertia control system to certain devices.

In the construction of many mechanical systems which are to be subjected to some given mode of motion, a disadvantageous compromise must often be made between desired strength and rigidity of the mechanical system, which introduces greater mass, and a weaker and less rigid one, which requires less force to maintain the desired motion. The compromises may become unduly restrictive in those systems where a given mode of motion is desired, but wherein the energizing system that supplies the actuating force is limited as regards the magnitude of the force it can develop without injuring itself.

One example of this type is the phonograph needle and record, in which the rotating record with its sound groove provides a limited force which actuates the pickup needle and its associated mechanical system, thus giving the pickup system a mode of motion that is predetermined by the recorded sound groove. Here it is desired that the vibrating pickup system be sufficiently rigid to vibrate as a whole, while at the same time possess low mass so that the actuating force the record groove must exert upon the needle to create the desired vibrations will not be so large as to cause excessive wear of the record.

Another disadvantage of the record wear produced is that it is distortional. This arises from the fact that the actuating force necessary to maintain a mechanical system in a state of vibration increases roughly as the square of the vibrating frequency. Hence, the record track must exert more force on the needle to produce the higher frequencies than to produce the lower frequencies, with the consequence that the wear and resulting distortion is greater for the higher frequencies.

The force $F_m$ that must be applied to a mechanical system of mass M to maintain it in a given mode of vibration (as far as the acceleration component A is concerned) is proportional to the effective mass M of the system times the acceleration A, or $F_m = MA$. Since in vibrating systems the magnitude of acceleration varies as the square of the frequency, it follows that if the mass M is a constant the acceleration actuating force $F_m$ must also vary in magnitude as the square of the frequency. It is also to be observed that, if the mass of the system can be made very small, or made to approach zero, or made to decrease as an inverse function of the frequency squared, the acceleration actuating force supplied by the needle which is necessary to maintain the desired mode of motion can be correspondingly reduced or held substantially constant, and so reduce the inertial distortional wear of the record.

In other types of moving mechanical systems the actuating force is given, and it is desired that the response of the mechanical system should be an accurate indication of said actuating force. An example of such a system would be the indicating pointer of a voltmeter or a mirror oscillograph, in which it is desired that the instantaneous deflection or scale reading of the mechanical system be always directly proportional to the actuating force derived from the impressed voltage function. Due to the mass inertia of the mechanical system, the indicating pointer will tend to lag behind an increasing force function having a positive acceleration component, and will tend to overshoot a decreasing force function having a negative acceleration component. That is to say, that when the acceleration of the system is positive (increasing), the pointer lags, and when the acceleration is negative (decreasing), the pointer overshoots the true scale reading of the actual impressed force or voltage function.

The above examples are illustrations of how the inherent mass within any given mechanical system subjected to a mode of motion produces inertial forces that give rise to detrimental and undesired effects. Subsidiary objects of the invention are to overcome the above-named types of difficulties.

I accomplish these and other objects by providing means for analyzing the mode of motion of the displacement function of the mechanical system, herein called the "secondary system," to obtain the component acceleration function of the said given mode of displacement. The acceleration component thus derived, herein designated as A, is then modified by some gain or amplifying factor K, the resulting amplified acceleration factor KA then being used to create and control a supplementary force acting on the secondary system in such a direction as to decrease the undesired inertial effects thereof.

In order to better explain my method for reducing the effective mass (or if desired, increasing the effective mass), and hence the inertial effects, of a mechanical system, attention may be directed to its application in a phonograph record and pickup. The turntable motor and record may be looked upon as the "primary system," since it supplies the energy and defines (by reason of the sound track cut in the record grooves) the mode of motion that is to be transmitted to the mechanical secondary system. Assuming that a magnetic inductor type of electrical pickup is used, then when the primary record system vibrates the needle and inductor of the secondary system, a voltage is generated in the electric pickup coil which is proportional to the velocity of motion of the needle and inductor. In the usual electric phonograph system this voltage output is fed through an audio amplifier and loud speaker, thus reproducing the recorded sound. I am concerned here with the actuating force which the primary record system must exert against the inertial reactance force or mass reaction force of the secondary system. It will be remembered that the inertial reactive forces exist only when the mass M of the secondary system is undergoing an acceleration A, and that the required applied force $F_m$ is proportional to the product of the mass M times the acceleration A, (or $F_m=MA$). If an external supplementary inertial force were created and applied to the secondary system, then the amount of inertial force that the record track, acting on the needle point, would have to supply would be correspondingly reduced, thus reducing distortional wear.

In order to create this supplementary inertial force, I analyze the displacement function of the secondary system for its acceleration component. In this particular case, it will be noted that the pickup voltage is proportional to the velocity of motion of the secondary system. Hence, the output voltage can be analyzed for its equivalent acceleration component. In mathematical terms, the acceleration component of a given velocity function is equal to the first derivative (or the time rate of change) of the said velocity function; or to the second derivative of the displacement function (since the first derivative of the displacement function gives the velocity function). In other words, the time rate of change of the velocity is proportional to the acceleration A. The method of analyzing for the acceleration component A in this case, then, involves the use of some means which will give the time rate of change of the output voltage (which is proportional to the needle velocity) delivered by the pickup coil. It is convenient to use an electrical analyzing system for this purpose. It is known that when a varying current flows through an inductance, the voltage drop generated across the inductance, or induced in a coil magnetically coupled thereto, is proportional to the time rate of change of the current variations. Therefore, if the pickup coil voltage were converted to a current flow of similar wave form, and the current passed through an inductance coil, then the resulting voltage generated across the inductance coil will be proportional to the acceleration component of the secondary system motion. Calling this acceleration voltage wave A, and providing means for amplifying A by some factor K to give KA, then it remains but to convert the KA electrical energy to a supplementary force acting on the secondary system. This can be most conveniently done in this case by electro-magnetic means, the resulting inertial supplementary force being applied to the secondary system in substantially the same direction and phase as the primary actuating force.

It will be remembered that the additional amount of primary force $F_m$ necessary to give the secondary system a given acceleration is equal to the product, mass M times acceleration A, or $F_m=MA$. Also, that the magnitude of the supplementary force $F_s$ is equal to the gain factor K times the acceleration component A obtained by analysis, or $F_s=KA$. Since the supplementary force $F_s$ assists the $F_m$ portion of the primary force, then the acceleration portion $F_m$ of the primary force can be reduced in magnitude by a corresponding amount. By the above means, that portion $F_m$ of the primary force which would normally be needed to accelerate the mass in the secondary system can be reduced or substantially eliminated. By a comparison of the two formulae, $F_m=MA$ and $F_s=KA$, it will be observed that the gain factor K is equivalent to a mass M which can be controlled as to magnitude and sign (positive or negative). The gain factor K may be a constant, or if desired can be varied according to some given function.

In the foregoing example, I obtain the input voltage function for the analyzer from the secondary system. However, in other types of mechanical systems it may be possible and more convenient to obtain the input function to the analyzer from the primary energizing system. For example, in the case of the primary energizing system being a voltage which creates a primary force to actuate an indicating pointer (secondary system), the input to the analyzer may be taken directly from the primary energizing voltage. This can then be analyzed for the acceleration component A, which is then modified by the factor K, giving KA. The KA can then be converted to a supplementary force acting on the secondary system, and in this case the primary system itself can also be used to make the conversion. The means by which the desired inertia feed-back can be effected without producing undesired coupling effects are familiar to the art, one means being by the use of a bridge circuit.

It will be observed that the above type of secondary system exists in many forms besides indicators, such as the moving element in voltmeters or in mirror oscillographs, electric recorders, electric engravers, and audio reproducers, to state a few of the more obvious types.

More particularly, the invention consists in the system and method hereinafter described, illustrated in the accompanying drawings and defined in the claims hereto appended, it being understood that various changes in form, arrangement and details both of circuits and of method within the scope of the claims may be resorted to without departing from the spirit of the invention.

For a clearer comprehension of the invention reference is directed to the accompanying drawings which illustrate a preferred embodiment thereof, wherein:

Figure 3 is a general wiring diagram of a phonograph electrical pickup constructed to perform the functions denoted in the Figure 2 block diagram, with the exception that the primary system, consisting of sound record and turntable, has been omitted.

Figure 4 is an illustration of a lateral recording groove in a record, and shows where distortional wear due to the acceleration force occurs.

Figure 5 shows a side view of a vertical recording groove in a record, illustrating where distortional wear and overshooting occur due to the acceleration and inertial forces.

Figure 6 shows an electrical pickup for vertical recordings, and illustrates how the supplementary inertia force generated by the electro-magnetic inertia coil system can be applied to the secondary mechanical system.

Figure 1:
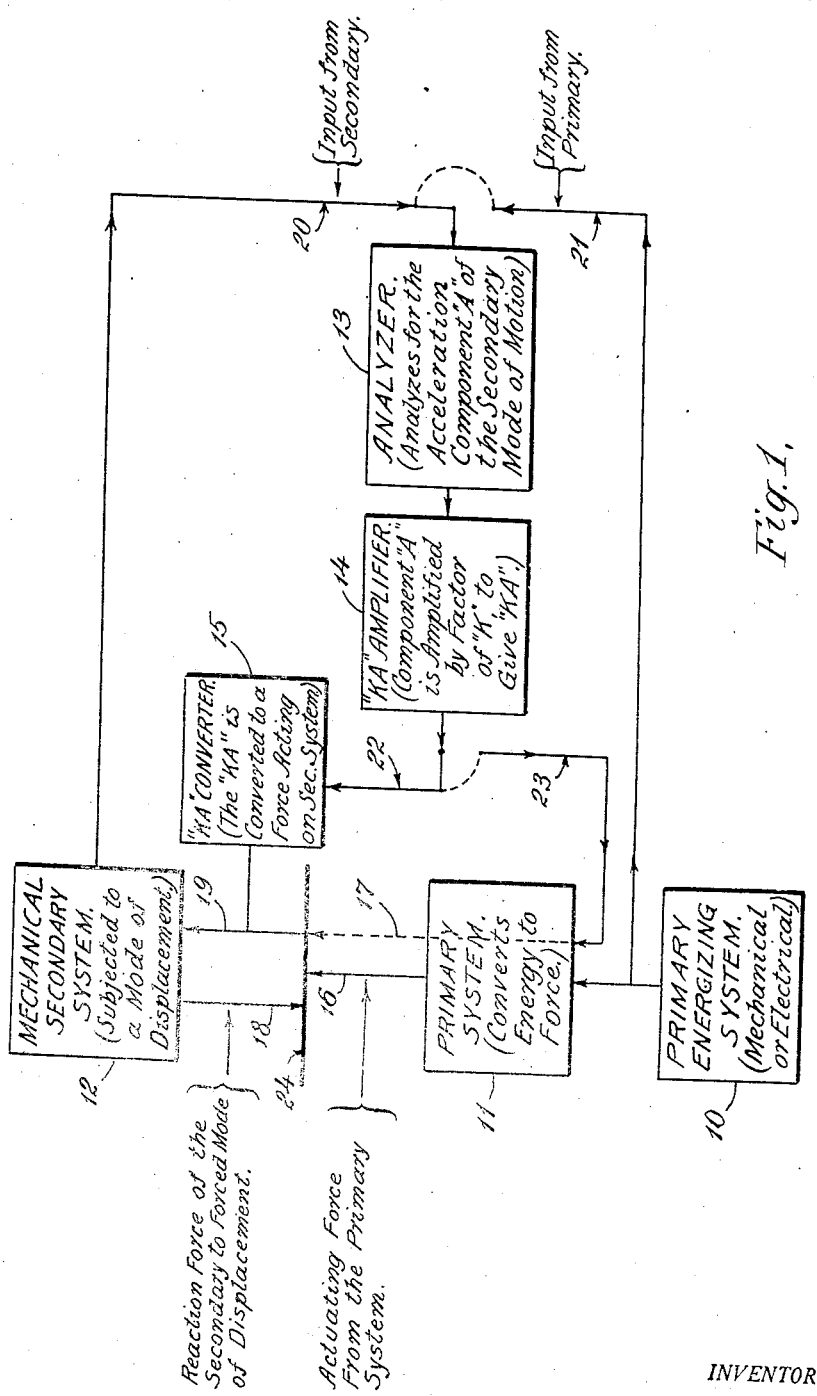
Figure 1 is a block diagram of the system of the invention in general form wherein each block represents a component of the system and is lettered to describe its function.

In the block diagram of Figure 1 each block represents some part or function of the acceleration feed-back inertia control system. Block 10 represents the primary energizing system, by which energy in mechanical or electrical form is supplied to the converter 11 of the primary system. The converter 11 changes its received energy to a primary force 16 which acts on the secondary system 12 through some line or surface of contact 24. The reaction force of the secondary system to the forced mode of motion is indicated by the arrow 18, which opposes primary force arrow 16. The block 12 represents the secondary system, which may be any kind of mechanical system that is subjected to a given mode of motion. The elements 10, 11, and 12 are present in one form or another in all systems to which this invention might be applied.

The analyzer 13 analyzes the secondary mode of motion, or its desired mode of motion, for its acceleration component A. The input to the analyzer 13 may come directly from the secondary system 12 as indicated by the line 20, in which case the secondary mode of motion is analyzed; or the input may come directly from the primary system 10—11 as indicated by the alternative line 21, in which case the desired mode of motion to be imparted to the secondary system is analyzed. The acceleration component A goes to an amplifier 14, where it is modified by a factor K. It will be noted that it is the KA output of the analyzer and amplifier that is desired, and therefore the amplifier could just as well precede or be incorporated within the analyzer. The output KA of the amplifier 14 is then converted to a supplementary force acting on the secondary mechanical system 12. The conversion may take place along the line 22 through a converter 15 which creates a supplementary force 19 acting on the secondary system 12; or the amplifier 14 KA output may take the alternative line 23 to the primary converter system 11 which produces the supplementary force 17 acting on the secondary system 12. In those systems where the latter alternative line 23 is applicable no additional converter 15 is necessary. However, special precautions may be required to prevent undesired coupling effects.

In the method depicted in Figure 1 the secondary system 12 is necessarily a mechanical system possessing a certain mass. The total actuating force 16 required to maintain the secondary system 12 in a given mode of motion may be broken up into three parts: (1), the component of force required to overcome the elastance of the system, which is proportional to displacement of a spring; (2), the component of force required to overcome the damping or frictional resistance of the system, which is proportional to velocity; and (3), the component of force required to overcome the inertia of the system, which results from the fact that a component of force proportional to the acceleration desired must be applied in order to accelerate or decelerate any mass. It will be noted that the first force is proportional to the displacement, the second roughly proportional to velocity, and the third proportional to the acceleration, of the secondary system. The analyzer 13 analyzes for the acceleration component (part (3) above) of the secondary system 12. It may do this by taking the time rate of change of the velocity; or it may first take the time rate of change of the displacement, which gives velocity, and then take the time rate of change of this velocity, which gives the acceleration component desired. The means of analysis may be purely mechanical by well known methods, or by electrical or by combinations of mechanical-electrical systems.

The acceleration component A output from the analyzer 13 is amplified by the factor K by the amplifier 14, giving an amplifier 14 output of KA. The desired amplification in 14, of course, may be effected by any suitable means, such as mechanical or electrical. Having created the KA, it remains but to convert it into a supplementary force acting on the secondary system 12. This may be done along the line 22 by using a separate converter 15 to create the supplementary force 19, or if the type of primary converter 11 is such that it can use the KA output of 14 directly, then the conversion can take place along the alternative line 23 to primary converter 11 thus creating supplementary force 17 which acts on the secondary system 12. Specific applications of some of the various possible combinations of elements of the system will be described in some of the following figures.

Figure 2:
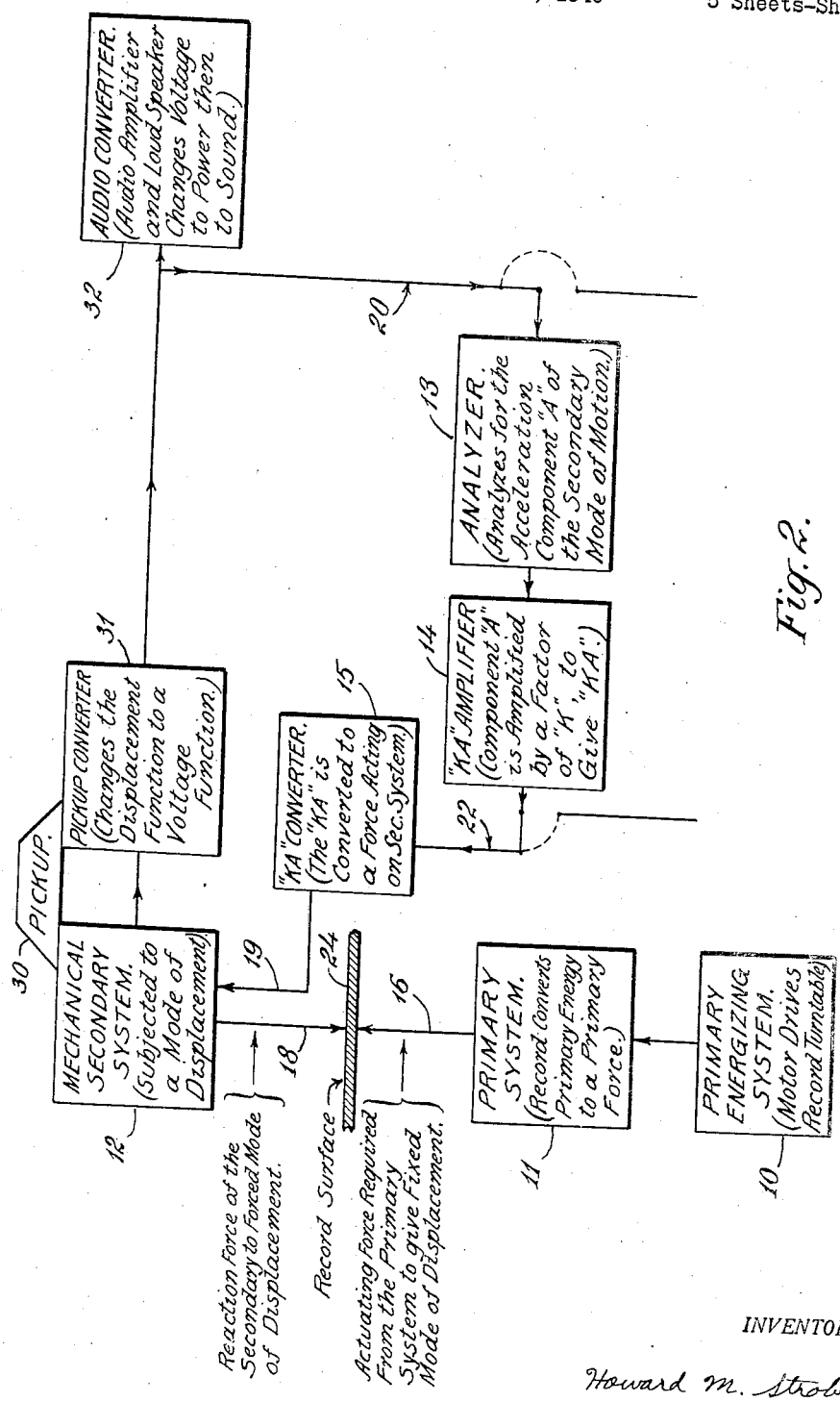
Figure 2 is a block diagram showing the application of the system to an electrical sound reproducer or pickup when mechanically energized by a record.

Figure 2 is a block and line diagram of an electrical pickup system used for sound reproduction from phonograph records in which a method of incorporating the inertia analyzer and feed-back principle is illustrated. In general it will be seen that the block diagram is very similar to that shown in Figure 1. Also, it will be noted that the blocks in Figure 2 which perform the same functions as those in Figure 1 are identified by the same reference characters. In Figure 2, the primary energizing system 10 is the motor which revolves the record turntable. The primary system converter 11 consists of the rotating record and its sound groove, whereby the needle of the secondary system 12 is held in the sound groove and is thus given a displacement motion determined by the sound track. It will be noted that the displacement of the needle is determined by the sound track, but that the force 16 exerted upon the needle by the record opposes the reaction force 18, and this reaction force 18 is determined by the impedance the secondary system 12 offers to the given displacement motion.

The pickup 30 is composed of two parts, one being the mechanical secondary system 12 which includes the needle and other vibrating parts of the pickup, and the other being the pickup converter 31 which changes the displacement function to a voltage function by means well known to the art. The voltage output of pickup-converter 31 normally goes to an audio converter 32, which amplifies the voltage, and then changes it to power and sound. The input 20 to the analyzer 13 is taken from the pickup-converter 31 output. In a magnetic-inductor type of pickup-converter 31 the voltage output will be proportional to the velocity of the vibrating system 12. Hence, the analyzer 13 need only analyze for the time rate of change of the voltage function 20 to obtain the acceleration component A of the vibrating system. One electrical means of doing this is to change the voltage function to a similar current function and pass the varying current through an inductance; then the voltage developed across the inductance, or induced in a coil magnetically coupled thereto, will be proportional to the rate of change of the current, and hence will give A. By means of the amplifier 14 and the KA converter 15, a supplementary force 19 is created which acts upon the secondary system 12.

Figure 3 is a wiring diagram of the block diagram in Figure 2. Elements which are common to the two figures have been numbered similarly. The primary record system is not shown in Figure 3. The pickup 30 is of the magnetic-inductor type, wherein the pivoted inductor 35 is vibrated by the needle between the pole pieces 36—36a. A permanent magnet 37 serves to maintain a magnetic flux from north (N) to south (S) through the pole pieces 36—36a. The pickup converter 31 consists of a pickup coil placed around the inductor 35, so that when it vibrates the magnetic flux through it varies and produces an output voltage at the terminals 38 by principles well known to the art. The voltage from 38 goes to the audio power amplifier and loud speaker 32. The voltage from 38 also serves as the input 20 to the analyzer 13. The analyzer 13 is shown as an electronic tube and circuit which converts the input voltage 20 to a proportional plate current output, said current being fed through the coil 39. According to well known electrical principles concerning magnetically coupled coils similar to coils 39 and 40, the voltage induced in coil 40 will be proportional to the rate of change of the current flowing through coil 39. Consequently, the voltage delivered by coil 40 will be proportional to the acceleration component A of the mode of motion of the secondary inductor 12. The A is then amplified by 14 to give KA, which flows along the line 22 to the terminals 42 of the inertia drive coil of the converter 15. The converter 15 is depicted here as of the magnetic type, and consists of a permanent magnet 44 with pole pieces 43—43a. As the current KA energizes the inertia drive coil the magnetic flux between the lower pole faces of the pieces 43—43a varies also, and by magnetic attraction upon the upper end of the inductor element 35 creates a supplementary force acting upon the vibrating inductor 35 or secondary system 12. By a proper choice of polarity and phase relationships, the supplementary force can be made to assist the originally applied primary force, and so reduce the accelerating force the record sound groove must supply in order to maintain the secondary system 12 in the desired mode of motion. Due to the close proximity of the pickup coil across terminals 38 and the inertia coil across terminals 42, some undesired magnetic coupling may exist between the two circuits. This can be controlled or minimized by various means, one of which is by the use of bucking coils 45 and 46 inserted in each circuit as shown. Switches may be provided for shorting out the bucking coils if desired. Another method of minimizing coupling would be to use a crystal pickup-converter 31 in conjunction with a magnetic type of supplementary force KA-converter 15.

Figure 4 is a fragmentary top view drawing of the sound track in a typical lateral recording. As the pickup needle moves along the record groove it is forced to move from side to side in accordance with the given sound track. At those points in the sound track where curvature occurs, the reaction force of the needle will increase due to the inertia of the secondary system and hence an increase in the primary force is necessary to create the acceleration required to make the needle follow the curves in the sound track. Therefore, excessive wear occurs at the points of curvature in the sound track, as is indicated in the drawing by the vertical shading lines. By analyzing for the acceleration component and feeding back a proportional supplementary force into the secondary system, the effective mass of the system (as viewed by the record) is reduced which results in a decrease of distortional wear on the record.

Figure 5 shows a fragmentary side view of a portion of a sound track in a "hill and dale" or vertical recording. It will be observed that the distortional wear introduced by the inertia of the needle and pickup system causes excessive wear at the troughs, as indicated by the shading lines, and causes the needle to overshoot the crests, as indicated by the dotted lines thereat. Correcting the pickup for inertial effects according to the method of this invention tends to overcome these effects of distortional wear and overshooting.

Figure 6 shows an electric pickup for vertical recordings, and illustrates one means which can be employed for creating a supplementary force acting on the secondary system. The pickup is depicted as of the dynamic type. The pickup-converter system 31 comprises the pickup coil connected to terminals 51 which is vibrated vertically by the needle and holder 50 within a constant magnetic field maintained by the field coil 52 connected to the terminals 53. The two sets of flexible supports 54 and 55 hold the vibrating system 12 in its central position while still permitting the necessary vertical motion. The KA converter system 15 which supplies the supplementary force to the secondary system 12 comprises a polarized magnet 56 magnetically acted upon by the electro-magnet 57, whose coils 58 are energized through the terminals 59. The circuit connections for the pickup are practically the same as for the pickup in Figure 3, and are familiar to the art.

Figure 7:
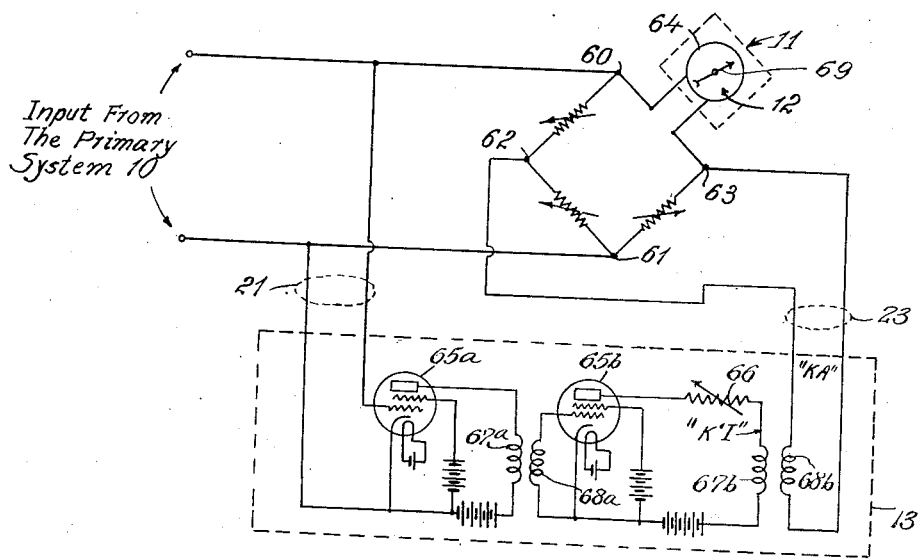
Figure 7 shows one application of the inertia control system where the input to the analyzer is taken directly from the primary system, and in which the primary system is also used for the supplementary force converter. This is the alternative arrangement represented in the block diagram of Figure 1.

Figure 7 shows one application of the invention as outlined in Figure 1. Figure 7 uses the alternative sequence of operations indicated in Figure 1, where the input to the analyzer 13 is taken from the primary system 10 along the line 21. Also, the output of the analyzer 13 is fed to the primary converter system 11 along the line 23. In Figure 7, the KA amplifier 14 is omitted since the analyzer 13 performs some amplification in the steps of converting the input voltage 21 to a proportional current K'I preparatory to analyzing for the KA acceleration component output 23. Prevention of undesired coupling between adjacent circuits, as of KA23 to either 10 or 21, is effected by means of a balanced bridge circuit having the pairs of terminals 60—61 and 62—63.

In the operation of the circuit of Figure 7, some primary energizing circuit provides an input voltage to the terminals 10, thus applying a voltage across the bridge terminals 60—61. The secondary system 12 comprising the indicating meter 64 with its indicating needle 69 is in one arm of the bridge, and the needle 69 gives an indication proportional to the voltage applied. The meter 64, by conventional construction of a voltmeter, comprises a primary converter 11, a common type being a current-carrying coil in a magnetic field which gives a deflecting force that is proportional to the current, and a movable mass or mechanical secondary system 12, which commonly consists of a pivoted needle (here 69), the mass of the moving coil, and a spring, the primary force then deflecting the needle or pointer 69 against the spring tension. It will be noted that the current coil of the primary converter system 11 which produces the actuating primary force by reacting against a stationary magnetic field is incorporated within the moving mechanical secondary system 12, and so adds to its mass. Normally, due to the inertia of the secondary system 12, rapid variations in the applied voltage may cause the indicating pointer to lag behind or overshoot the actual instantaneous applied voltage. To control undesired inertia effects of the secondary system 12 (or needle 69), the input voltage 10 is applied to the analyzer 13 along the conductors 21. The analyzer 13 is shown as an analyzer with two differentiating steps, having electronic tubes 65a and 65b, wherein the first circuit 65a, 67a, 68a converts the primary voltage (displacement function) into a proportional current and analyzes it for its time rate of change, thus applying a voltage (velocity component) to tube 65b, which in turn converts it into a proportional current output, K'I, where K' designates some factor of amplification. In order that the output currents of the tubes 65a, 65b, be in phase and proportional to the impressed voltage function, the circuits should be predominately resistive, since reactive elements would introduce undesired phase shifts. The variable resistor 66 affords a means of controlling the current output. The K'I current (velocity function) goes to the coupled coils 67b and 68b, thus inducing in coil 68b a voltage KA proportional to the rate of change of current in coil 67b according to well known electrical principles. The KA voltage is applied to the indicating meter 64 through the conductors 23 and bridge terminals 62—63. The polarity of the KA feed-back will determine operation of the apparatus. If positive, then when the primary acceleration force is increasing the supplementary acceleration force will aid, and vice versa. On the other hand, if the feed-back is negative, then when the primary acceleration force is increasing the supplementary acceleration force will oppose, and vice versa, so that in effect the negative feed-back of the acceleration component and its conversion to a proportional supplementary force simulates an increase in the effective mass of the secondary system.

Figure 8:
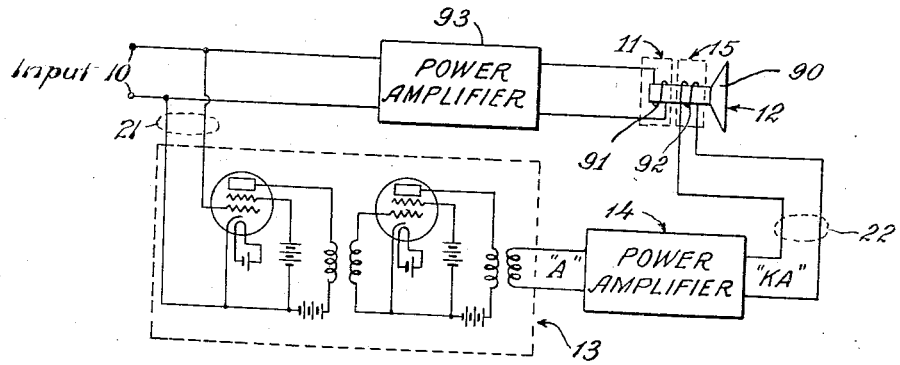
Figure 8 shows an application similar to that in Figure 7, except that the supplementary force converter is placed in the mechanical secondary system. The supplementary force converter is the additional voice coil on the speaker diaphragm.

Figure 8 shows another application of the invention, wherein it is desired to reduce the inertia effects of a secondary system 12 comprising a loud speaker diaphragm 90 which is normally energized by the primary converter system 11 with its drive coil 91. Here the input to the analyzer 13 is taken from the primary energizing system 10 along the line 21. The KA converter 15 for creating the supplementary force acting upon the diaphragm 90 of secondary system 12 is realized, however, by a separate drive coil 92 energized by the KA amplifier in the line 22. The operation of the individual component parts of the system is, in general, similar to those previously described.

In comparing the circuit of Figure 8 with that of Figure 7, it will be observed that the audio power amplifier 93 and its speaker unit could be substituted in place of meter 64 in the bridge circuit of Figure 7. In this case, of course, the supplementary converter 15 with its drive coil 92 and its associated apparatus would not be necessary.

Figure 9:
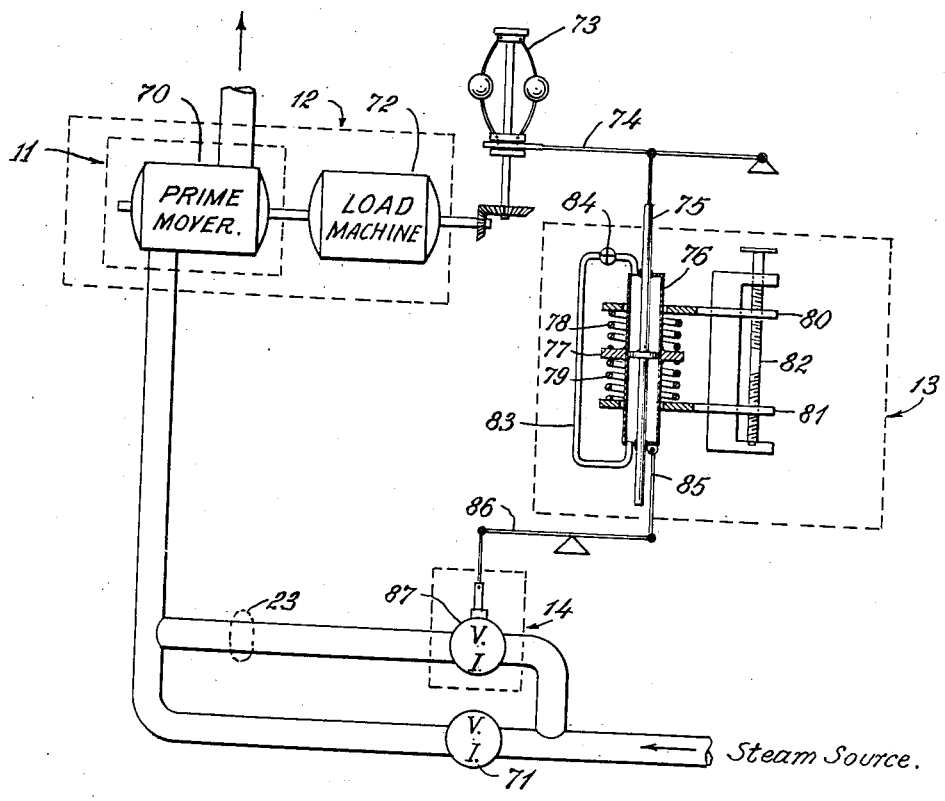
Figure 9 shows an application of the system to a rotating mechanical element, wherein the analysis for the acceleration component is accomplished with a mechanical analyzer.

Figure 9 shows an application of the invention to mechanical rotating machinery. The primary converter system 11 comprises a prime mover 70, such as a steam turbine. The steam admitted to the prime mover 70 is controlled by the setting of throttle valve 71. The load machine 72 may be any rotating device, such as a generator. The secondary system 12 here comprises the rotating elements of the machines 70 and 72. A conventional ball governor 73 operates the lever 74, which in turn operates the plunger rod 75 of the analyzer 13. The plunger rod 75 moves inside the oil filled cylinder 76. At the center of the cylinder 76 is attached an annular flange 77, which is balanced between two opposing springs 78 and 79. The springs 78 and 79 are held in place by the plates 80 and 81, and the distance of separation between the plates is determined by the setting of the threaded screw 82. The upper and lower chambers of the cylinder 76 are connected by a pipe 83 in which there is a by-pass valve 84. In operation, a change in speed of the secondary system 12 through the action of the governor 73 causes a movement of lever 74 and plunger rod 75. If the plunger rod 75 is moved upward a given distance it will tend to force the oil through the by-pass valve 84 from the upper to the lower cylinder chamber. If the by-pass valve 84 is open full way, the oil can flow easily and little force will be exerted on the cylinder. If the by-pass valve 84 is partly closed the coil cannot rapidly escape from the upper chamber and hence the plunger rod 75 will pull the cylinder 76 with it against the force of the spring 78. As the oil passes to the lower chamber the spring 78 will bring the cylinder 76 back to its normal central position. It will be observed from the foregoing that the displacement of the cylinder 76—77 will be proportional to the rate of change of the plunger rod 75 and lever 74. If the rod 75 moves through a given distance slowly, the rate of change is small, and the cylinder 76—77 deflection is small; if quickly, the rate of change is large, and the cylinder deflection is large. The movement of the cylinder 76—77 is used to control a supplementary throttle valve 87 by the connecting link 85 and lever 86. The valve 87 serves as a KA amplifier 14, and feeds a KA quantity of steam to the primary converter 11, wherein it is converted to the desired supplementary force.

In this particular application it will be noted that the secondary system 12 comprising the rotating elements of 70 and 72 may be actuated by forces originating in either 70 or 72. That is, the prime mover 70 applies a positive force to the secondary system 12, and the load machine 72 applies a negative force, both of which taken together comprise the resultant primary force actuating said secondary system 12. Under the conditions that the prime mover force balances the load machine force the secondary system 12 rotates at a constant angular velocity and hence the angular acceleration component is zero. This is the ideal condition desired in normal steady state operation. If the inertia control is set to increase the effective inertia of the rotating mass, it will tend to stabilize the reaction of the rotating system to changes in load. For if a sudden increase in load should occur, the angular velocity of the rotating mass would start to decrease; the inertia control system would then create an assisting supplementary force proportional to the acceleration component, while the conventional velocity governor would operate to reset the main throttle for the new load condition.

I claim:

1. In a pickup system comprising primary and secondary systems, said primary system including an energizing source and a converter impressing a predetermined mode of motion upon the movable mass of said pickup comprising said secondary system, the method of inertia control which includes the steps of, analyzing said predetermined mode of motion for its equivalent acceleration component effect upon said secondary system, controlling said acceleration component as to magnitude and phase, and utilizing the value of said component to control a supplementary force actuating said secondary system, whereby control over the effective inertia of said secondary system as viewed from said primary system is established by said supplementary force.

2. In a method of inertia control for a pickup, the steps which include, energizing a movable mass by an actuating force, analyzing the motion of said mass for its time rate of change of velocity thus obtaining the acceleration component of its motion, creating a voltage proportional to said acceleration component value, controlling said voltage as to magnitude and phase, and converting a supplementary energizing source controlled by said voltage to a proportional supplementary force also actuating said mass, whereby control over the effective inertia of said mass is established by said supplementary force.

3. In a pickup system comprising primary and secondary systems, said primary system including an energizing source and a converter developing a primary force therefrom, the method of inertia control which includes the steps of, actuating the movable mass comprising said secondary system by said primary force, analyzing the motion of said secondary system for its time rate of change of velocity thus obtaining the acceleration component of its motion, creating a voltage proportional to said acceleration component, controlling said voltage as to magnitude and phase, and continuously converting a supplementary energizing source controlled by said voltage into a proportional supplementary force actuating said secondary system whereby control over the effective inertia of said secondary system as viewed from said primary system is established by said supplementary force.

4. In an inertia controlled pickup apparatus comprising primary and secondary systems, said primary system including a primary energizing source whose magnitude varies according to a given pattern with a converter for developing a proportional primary force function therefrom, said secondary system comprising a movable mass, with means for actuating said secondary system by said primary force, means for analyzing the variations of the given primary energizing force pattern for its equivalent accelerating effect upon the secondary system, means for creating a voltage proportional to said accelerating effect, means determining the phase of said voltage, means for controlling the magnitude of said voltage, means for converting said voltage into a proportional supplementary force, and means for applying said supplementary force to said movable secondary system of said pickup.

5. In an inertia controlled pickup system, containing a movable mass subjected to a predetermined mode of motion, means for analyzing said mode of motion for its time rate of change of velocity, means for creating a voltage proportional to said time rate of change of velocity, means determining the phase of said voltage, means for controlling the magnitude of said voltage, means for converting the magnitude value of said voltage into a proportional supplementary force, and means for applying said supplementary force to said movable mass, whereby control over the effective inertia offered by said mass to said mode of motion is established.

6. In an inertia controlled pickup apparatus comprising primary and secondary systems, said primary system including an energizing source and a converter impressing a predetermined mode of motion upon the movable mass of the pickup comprising the secondary system, means for analyzing the resulting mode of motion of said mass for its acceleration component, means determining the phase of said acceleration component, means for controlling the magnitude of said acceleration component, means for converting the magnitude value of said component into a supplementary force controlled thereby, and means for applying said supplementary force to said secondary system, whereby control over the effective inertia of said secondary system as viewed from said primary system is established.

7. In an inertia controlled pickup system including a movable mass energized by an actuating force, means for analyzing the resulting motion of said mass for its acceleration component, means determining the phase of said acceleration component, means for controlling the magnitude of said acceleration component, means for continuously converting the magnitude value of said acceleration component into a supplementary force controlled thereby, and means for applying said supplementary force to said mass, whereby control over the effective inertia of said mass is established.

8. In an inertia controlled pickup apparatus comprising primary and secondary systems, said primary system including an energizing source and a converter for developing a primary force, said secondary system comprising a movable stylus, means for actuating said secondary system by said primary force, means for analyzing the resulting motion of said secondary system for its acceleration component, means for creating a voltage proportional to said acceleration, means determining the phase of said voltage, means for controlling the magnitude of said component, means for continuously converting the magnitude value of said acceleration voltage into a supplementary force controlled thereby, and means for applying said supplementary force to said secondary system, whereby said means permits establishing control over the effective mass of the stylus of said secondary system as viewed from said primary system.

9. In an inertia controlled pickup apparatus having a movable mass, including a stylus and its associate parts, subjected to a predetermined mode of motion, means for analyzing the motion of said mass for its acceleration component, means determining the phase of said acceleration component, means for controlling the magnitude of said acceleration component, means for converting the energy from a supplementary source controlled by said modified component into a supplementary force, and means for applying said supplementary force to said mass.

10. In an inertia controlled pickup apparatus containing a secondary system responsive to a primary energizing force, said secondary system comprising a movable mass including the pickup stylus and its associate parts, means for analyzing the motion of said secondary system for its acceleration component, means determining the phase of said acceleration component, means for controlling the magnitude of said acceleration component, means for converting the energy from a supplementary source controlled by said component into a supplementary force and means for applying said supplementary force to said secondary system, whereby the effective mass of the secondary system as viewed from the primary system may be controlled.

11. In an inertia controlled pickup apparatus responsive to a primary system comprising an energizing source and a converter for developing a primary force, a secondary system comprising a movable mass including the pickup stylus and its associate parts, means for actuating said secondary system by said primary force, means for analyzing the motion of said secondary system for its acceleration component, means for transforming said acceleration component into an equivalent electric current proportional thereto, means determining the phase of said electric current, means for controlling the magnitude of said electric current, means for converting said modified acceleration component into a supplementary force, and means for applying said supplementary force to said secondary system.

12. In an inertia controlled pickup apparatus, said pickup being of the magnetic inductor type having a movable mass including the stylus and the inductor element, said movable mass being subjected to a mode of motion as predetermined by the record groove, an analyzer for analyzing the voltage output of the inductor pickup coil for its equivalent acceleration component effect upon the said movable mass of the pickup, said analyzer including a linearly operated vacuum tube having grid and plate circuits, said grid circuit being energized by said given voltage output and causing a proportional current to flow in the said plate circuit, said plate circuit including a primary coil magnetically linked to a secondary coil so that the voltage induced in said secondary coil is proportional to the rate of change of current in the primary coil, an amplifier, which amplifies said analyzer voltage output and produces a current output proportional to said equivalent acceleration component, and an electromagnetic converter, which utilizes said amplifier current output to create a magnetic field actuating said movable mass of said pickup, whereby the effective inertia of said movable mass may be controlled.

13. In a pickup having a mechanical vibratory system including a movable mass subjected to a primary force for vibrating said system according to a predetermined displacement pattern, means for producing an electromotive force proportional to the acceleration, means determining the phase of said electromotive force, means for controlling the magnitude of said electromotive force, and means for causing said modified electromotive force to produce a supplementary mechanical force which controls the inertial effects of said mechanical system.

14. In a method for controlling the effective mass of the movable member of a pickup, the steps which include, subjecting said movable member to a predetermined mode of motion, creating a first voltage output from said pickup which is proportional to the velocity of movement of said movable member, creating a second voltage which is proportional to the time rate of change of the magnitude value of said first voltage, controlling the magnitude of said second voltage, converting said second voltage into a proportional force, and actuating said movable member with said force.

15. In a pickup system comprising primary and secondary systems, said primary system including an energizing source and a converter impressing a predetermined mode of motion upon the movable member of given mass comprising the secondary system, the method of inertia control which includes the steps of creating a voltage having a magnitude proportional to the time rate of change of the velocity of said movable member, controlling said voltage as to magnitude and phase, and converting said voltage into a proportional force actuating said movable member of said secondary system, whereby control over the effective inertia of the mass of said movable member of said secondary system as viewed from said primary system is established.

16. In an inertia controlled pickup apparatus having a movable mass, including a stylus and its associate parts, said stylus being subjected to a predetermined mode of motion, means for analyzing the motion of said mass for its time rate of change of velocity, means for creating a voltage proportional to said time rate of change of velocity, means for controlling the magnitude of said voltage, means for creating a supplementary force proportional to said voltage, and means for applying said supplementary force to said movable mass.

17. In an inertia controlled pickup apparatus, said pickup being of the magnetic inductor type having a movable mass including the stylus and the inductor element, said movable mass being subjected to a mode of motion as predetermined by the record groove, an analyzer for analyzing the voltage output of the inductor pickup coil, said analyzer including an input and an output circuit, said input circuit being energized by said voltage output from said pickup coil, said analyzer creating in its output circuit a voltage proportional to the time rate of change of the voltage impressed on its input circuit, and a supplementary coil in said pickup apparatus adapted to create a magnetic field actuating said movable mass of said pickup when energized, said supplementary coil being energized and controlled by the output from said analyzer.

18. Electric inertia control device for mechanical energy produced by a transmitter record allowing to give in a receiver pickup stylus a movement substantially proportional to the sound track displacement pattern of the transmitter record comprising: a receiver pickup, in said receiver pickup a movable part, means to transform into electrical energy the mechanical energy applied to said movable part, an amplifier of said electrical energy, an analyzer transforming the amplified electrical energy into an output voltage proportional to the time rate of change of the velocity of said movable part, means to connect in series the receiver the amplifier and the analyzer, means to transform said output voltage energy into mechanical energy actuating the movable mass of said receiver pickup.

19. Electric device for reducing the effective mass of the needle of a pickup so that said movements can be more easily generated by the record sound track comprising: a pickup, a vacuum tubes analyzer, a vacuum tubes amplifier, means to impress the electrical voltage created in said pickup on the input circuit of said analyzer, means to connect the output circuit of the amplifier with the pickup, means in said analyzer to create an electric voltage output proportional to the time rate of change of said impressed voltage, means to impress said analyzer voltage output on the input circuit of the amplifier, means in said pickup to convert the impressed voltage output of said amplifier to a supplementary force actuating said needle of said pickup.

20. Electric device for rendering the movements of the needle of a pickup more responsive to an actuating force so that said movements can be more easily generated by a mechanical energizing device comprising: a pickup, an analyzer, an amplifier, means to impress the electrical voltage created in said pickup on the input circuit of said analyzer, means to connect the output circuit of the amplifier with an auxiliary coil fastened to said pickup and able to move said needle in the magnetic field of the pickup, means in said analyzer to create an electric voltage output proportional to the time rate of change of said impressed voltage, and means to impress the output of said analyzer on the input circuit of said amplifier.

21. In a pickup having a mechanical vibratory system including a movable member of given mass subjected to a primary force for vibrating said system according to a predetermined displacement pattern, means for creating an electromotive force proportional to the time rate of change of velocity of said vibratory system, means determining the phase of said electromotive force, means for controlling the magnitude of said electromotive force, and means for causing said modified electromotive force to create a supplementary mechanical force actuating said mechanical vibratory system.

HOWARD M. STROBEL.